United States Patent Office 3,060,150
Patented Oct. 23, 1962

3,060,150
CONTROLLING THE RATE AT WHICH MATERIALS ARE CURED BY METALLO ORGANIC ACTIVATORS
Jerome A. Preston, Toledo, Ohio, assignor to The Ransom & Randolph Company, Toledo, Ohio, a corporation of Ohio
No Drawing. Filed Feb. 19, 1958, Ser. No. 716,032
19 Claims. (Cl. 260—46.5)

This invention relates to controlling the rate at which materials are cured to metallo organic activators, and, in a specific embodiment, to retarding the rate at which silicones generally, and silicone rubbers specifically are cured by metallo organic compounds.

The use of various activators for curing different materials has been known for a considerable period of time, and has been used more or less broadly. In some instances, such materials are used in conjunction with other activators, for example of the peroxide or ozonide type, principally to accelerate curing. In other instances, however, the metallo organic materials are used as the sole activators.

It has been found that the rate of cure of certain materials, in the presence of metallo organic materials, is too rapid for some uses. As a specific example, certain compositions comprising silicones or polysiloxanes have recently been made available. These silicones can be cured to an elastomeric condition, at room temperature, in the presence of certain metallo organic materials. A specific material of this type is cured rapidly at room temperature when mixed with approximately 1 percent of a 28 percent solution of tin octoate in 2-ethyl hexanoic acid. The elastomer which is produced after a relatively short room temperature cure reproduces accurately the shape of an object in contact with which cure occurred, and is dimensionally stable under either dry or humid conditions for a substantial period of time. These characteristics of the material suit it admirably for use as an impression material, because they enable it to make an accurate reversed reproduction of an object. The above-identified elastomeric materials would be superior to presently available impression materials except that cure proceeds too rapidly for this use. This material can be worked for about two minutes, after activation as indicated, which time is insufficient in most instances to mix the activator with the silicone and to make an impression. If a lesser amount of the activator is employed the length of time that the material is workable is extended only slightly, for example by about 15 to 20 seconds, which is an insufficient extension of working time, but then an impracticably long time is required for cure to proceed to an extent such that the elastomer can be used as an impression. Therefore, despite its promising characteristics, this particular material is unsuited for use as an impression material because of its extremely short working life.

The terms "percent" and "parts" are used herein, and in the appended claims, to refer to percent and parts by weight, unless otherwise indicated.

The present invention is based upon the specific discovery that any of certain compounds selected from a particular class can be mixed with the indicated or another silicone material and activator therefor, and that the resulting material will then cure to an elastomeric state in a practicable time, but will remain workable for a substantially increased period of time, so that it is suitable for use as an impression material.

It is, therefore, an object of the invention to provide a composition which is curable at room temperature to an elastomeric condition, and which has, by virtue of the incorporation therein of a particular material, a sufficiently long working life to enable its use as an impression material.

It is a further object of the invention to provide an improved step in a method for producing a room temperature cured silicone elastomer, which step involves the mixing therewith of a particular material.

It is still another object of the invention to provide an improved activator composition for a curable material, which composition comprises a metallo organic activator and a retarder.

Other objects and advantages will be apparent from the description which follows, which is intended only to illustrate and disclose, but in no way to limit, the invention.

According to the invention a new activator composition is provided. Such composition comprises a metallo organic activator and a retarder. In general, one class of such retarders can be represented by the generic formula:

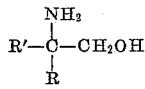

where R and R' can be the same or different, and each can be alkyl, aryl, hydroxyl, alkaryl, aralkyl, or substituted alkyl, substituted aryl, substituted aralkyl or substituted alkaryl. Specific examples of such retarders include 2-amino-2-methyl-1-propanol:

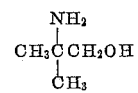

2-amino-2-methyl-1,3-propanediol:

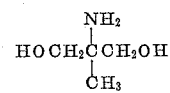

2-amino-2-ethyl-1,3-propanediol:

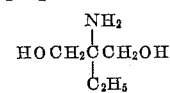

and 2-amino-2-hydroxymethyl-1,3-propanediol:

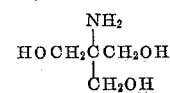

Morpholine:

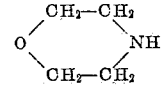

is an example of a different type of retarder that is also effective:

Other retarders selected from the class represented by the foregoing generic formula can also be employed.

When a retarder of the indicated type is mixed with a metallo organic activator such as tin octoate, the rate at which cross-linking, for example of a room temperature curing silicone rubber, is activated by the resulting mixture is substantially lower than the rate at which the same cross-linking is activated by the same amount of the activator. The final properties of the material produced, after cure, however, are not detectably changed by use of the mixture instead of the metallo organic activator alone. It is believed, therefore, although the invention is in no way to be limited by or to the following theoretical discussion, that the retarder in some way which is not fully understood sequesters a part of the activator, and temporarily makes the sequestered part ineffective as an activator. The mechanism of the sequestration is not clearly understood, but seems to involve an equilibrium reaction of some sort, and the production of a product from the metallo organic activator and the retarder, which product may well be a chelate, and which is not itself effective as an activator. If a reaction product is formed, however, the reaction must be reversed as unreacted metallo organic activator is consumed in the desired cure, so that additional metallo organic activator, over that initially available for effecting cure, is released in amounts sufficient to complete curing to essentially the same condition that would have been achieved had no retarder been employed. It is also possible that retarders of the indicated type are merely negative catalysts for the indicated curing reactions, and do not in any way enter chemically into the reaction, or that pH control is at least partially responsible for their effect. In any event, the indicated desired retarding of rate of cure, without appreciable effect upon extent of cure, is achieved when a solution comprising a metallo organic activator and a retarder of the indicated class is employed instead of only the metallo organic activator.

Various metallo organic activators other than tin octoate, which has previously been identified, are also known. For example, a solution of lead octoate or of lithium octoate, preferably in 2-ethyl hexanol, can be used as a metallo organic activator. In addition, organic compounds of cerium, beryllium or cadmium, in suitable solutions, can be so employed. Organic compounds, usually salts, of potassium, sodium, magnesium, iron, vanadium, cobalt, copper, barium, strontium, thorium, chromium, manganese, zinc, aluminum, nickel, calcium and mercury have also been used for effecting such cure (see U.S. Patent 2,449,572). The mechanism by which such metallo organic activators effect the cure of various materials is not fully understood. It is believed, however, that a free radical mechanism is involved where the metallo organic activator reacts with the material to be cured, and that the latter is converted to a free radical, for example by removal of hydrogen therefrom. Two such free radicals then react with one another to produce a cross-linked, cured product. A discussion of this type of curing, in the presence of benzoyl peroxide, will be found in Silicones and Their Uses, McGregor, McGraw-Hill Book Company, Inc., New York, 1954, pages 164, and following (see also U.S. Patents 2,448,565; 2,460,795; 2,541,137 and 2,560,498). The discussion is specifically in connection with the production of silicone rubbers from dimethyl siloxanes blended with fillers. Similar blends of dimethyl siloxanes and fillers are believed to cure in the presence of a metallo organic activator, to produce, at room temperature, a silicone rubber. Certain such room temperature cured silicone rubbers are suitable impression materials, as discussed above.

The proportions of a metallo organic activator and a retarder that should be employed, and the amount of the metallo organic activator, in effecting any given desired cure, depend upon numerous factors. The minimum amount of the activator, for example, should be the least which gives the desired extent of cure in a period of time which is feasible under all the controlling circumstances. Where this minimum amount of the activator causes the initial part of the cure to proceed at too fast a rate, for example so that the composition cannot be worked for a sufficiently long period of time, at least a small but effective proportion of a retarder must be used in conjunction with the activator. The minimum effective proportion of the retarder will be the least amount thereof which extends the time during which such initial stage of the cure occurs, for example the working life, to the minimum time that is required. In a specific instance, when it is desired to produce an impression material from a silicone material which cures to an elastomeric condition at room temperature, from about 0.2 percent to about 0.4 percent of tin octoate and from about 0.02 percent to about 0.04 percent of 2-amino-2-ethyl-1,3-propanediol can be utilized to activate and retard, respectively, the cure, the percentages of tin octoate and of 2-amino-2-ethyl-1,3-propanediol being based upon the total amount of uncured silicone material. Generally the same proportions of other activators and retarders should be employed in producing an impression material.

It is usually preferred that both the retarder and the activator be in solution when employed in curing a material. Tin octoate, for example, can be dissolved in 2-ethyl hexanoic acid, as can lead octoate and lithium octoate. Lithium octoate can also be dissolved in 2-ethyl hexanol; cerium compounds can be dissolved in phenol or in organic solvents which include a nonyl group. The retarders according to the invention can be dissolved, for example, in denatured alcohol, in 2-ethyl butyric acid, or in a dilute water solution of stearic acid. As a practical matter, it is usually preferred that the solutions of the activator and of the retarder contain from about 1 percent to about 50 percent of the respective materials. After mixing of the two solutions, the concentrations of the activator and of the retarder, in the combined solution, are correspondingly reduced. A suitable amount of an appropriate activator solution and a suitable amount of an appropriate retarder solution can be mixed with the material to be cured, and appropriate conditions established, after any desired manipulative steps, to effect final cure. If preferred, the retarder solution and the activator solution can be combined, and an appropriate amount of the combined solution mixed with the material to be cured. When such procedure is employed, the two solutions are usually mixed shortly prior to use of the combined solution, and in any event within a week of use, because reactions which proceed in the combined solution destroy the effectiveness thereof. In the case of the indicated room temperature curing silicone rubber material, the mixing can conveniently be carried out manually, and the composition which is produced, comprising the silicone material, the retarder and the activator, packed in a void to be reproduced by an impression. The material can either be spread in the void, for example using a spatula-like implement, or placed in a syringe and ejected into the void.

The following examples are presented solely for the purpose of further illustrating and disclosing the invention, and are in no way to be construed as limitations thereon.

EXAMPLE 1

A 0.1 cc. portion of a 28 percent solution of tin octoate in 2-ethyl hexanoic acid and a 0.02 cc. portion of a 14 percent solution of 2-amino 2-ethyl 1,3-propanediol in 95 percent ethyl alcohol were mixed with 10 grams of a curable silicone material[1] which is commercially available. After a thorough mixing which required about 45 seconds, a portion of the resulting material was packed into a suitable mold cavity. The remainder of the material was maintained under close observation, and was observed gradually to increase in viscosity for a period of about 4¼ minutes after mixing was complete until it reached a viscosity at which it could no longer be worked. Approximately 2¼ minutes later the material had gelled,

[1] A material produced substantially in accordance with Example I of U.S. Patent 2,843,555, issued July 15, 1958. Such material is produced in the following manner: 100 parts of octamethylcyclotetrasiloxane is heated for about 2 to 4 hours at a temperature of about 140° C. with 0.01% by weight, of potassium hydroxide until a highly viscous mass bordering on a gummy solid is obtained. This linear, long-chain methylpolysiloxane has a viscosity of about 2,000,000 centipoises, and has a ratio of approximately two methyl groups per silicon atom. This high molecular weight methylpolysiloxane is mixed with 0.5%, by weight, thereof water, and the mixture of ingredients heated with stirring for two hours at 150° to 175° C. until a product having a viscosity of about 2,000 centipoises (at about 30° C.) is obtained. This material is a linear, fluid methylpolysiloxane having terminal silicon-bonded hydroxyl groups. To 100 parts of this low molecular weight polymer are added 20 parts of diatomaceous earth, 20 parts zinc oxide and 30 parts calcined clay. The above mixture is then blended with 2 parts of a liquid, water-insoluble hydrolysis product of partial tetra-ethyl silicate to complete the formulation of the curable material.

and 15 minutes after mixing was started the material had cured to a tough, resilient, silicone rubber which could be deformed substantially and would return to its original shape. The portion of the material that had been placed in a mold was removed therefrom, and was found to conform accurately to the shape thereof. The resilient nature of the cured material enabled its use as an impression material even where substantial undercuts were involved.

When, for purposes of comparison, but not in accordance with the invention, the procedure described in the preceding paragraph was repeated except that only the tin octoate solution and the silicon material were mixed, it was found that the resulting material increased in viscosity at a substantially greater rate so that it had a working life of only two minutes after mixing was started, or 1¼ minutes after mixing was completed. Such a short working life has been found to be unsuited for the great majority of instances where an impression material is desired. The material gelled approximately 4¼ minutes after mixing was started, and cured, approximately 10 minutes after mixing was started, to a condition which could not be distinguished from the condition of the previously identified cured material.

A metallo organic activator and a retarder according to the invention have also been used in connection with the curing, at room temperature, of various simple silicone materials. Representative materials and formulations produced therefrom are presented in Example 2, below:

EXAMPLE 2

A room-temperature-curable dimethyl silicone polymer having a molecular weight of from 400,000 to 500,000 and a viscosity in a solution of 5 percent of isopropyl alcohol and 35 percent of toluene, of from 10 to $12 \times 10^6$ centistokes was cured at room temperature with a catalyst and retarder composition according to the invention. A 5 gram portion of the indicated silicone polymer, diluted with xylene to a viscosity of from 90,000 to 200,000 centistokes, was mixed, at room temperature, with a 0.1 gram portion of tin octoate [2] and a 0.01 gram portion of 2-amino-2-ethyl-1,3-propanediol, [3] and the resulting admixture was allowed to stand at room temperature. At the end of approximately 20 minutes the composition had cured to a gelled condition, and, at the end of approximately 30 minutes, it had cured to a hard condition. When the procedure described in this paragraph was repeated except that the 2-amino-2-ethyl-1,3-propanediol was omitted, the silicone was found to cure to a gelled condition in approximately 14 minutes, and to a hard condition in approximately 22 minutes.

The procedure described in the preceding paragraph, using 2-amino-2-ethyl-1,3-propanediol, has also been used to cure various other known room-temperature-curable silicone materials. In order to facilitate tabulation of the results, the identities of the various silicone materials are presented below, together with an abbreviated designation for each:

"Silicone A," a methylphenylsiloxane
"Silicone B," a dimethylsiloxane
"Silicone C," a dimethylsiloxane
"Silicone D," a dimethylsiloxane
"Silicone E," a dimethylsiloxane having a viscosity of 10 to $12 \times 10^6$ and a molecular weight of about 500,000

The results achieved by curing the identified materials by the indicated procedure are presented in the following table, where the reported "working time" is the time required for the material to gel, and the reported "setting time" is the time required for the material to be cured to a hardened condition.

[2] The tin octoate was added as a 28 percent solution thereof in 2-ethyl hexoic acid.
[3] The 2-amino-2-ethyl-1,3-propanediol was added as about a 15 percent solution thereof in ethyl alcohol.

Table

| Silicone Material | Working Time in Minutes | | Setting Time in Minutes | |
|---|---|---|---|---|
| | With Retarder | Without Retarder | With Retarder | Without Retarder |
| Silicone A [1] | 22 | 10 | 35 | 20 |
| Silicone B | 5 | 2 | 10 | 5 |
| Silicone C | 5 | 2 | 12 | 6 |
| Silicone D | 0 | 2 | 26 | 20 |
| Silicone E | 8 | 2 | 28 | 20 |

[1] This silicone material was not diluted with xylene.

It has been found that the procedure described above can be modified to the extent that the solutions of tin octoate and 2-amino-2-ethyl-1,3-propanediol are mixed in the proportions of 5 volumes of the former to 1 volume of the latter, and 0.12 cc. of the resulting solution is admixed with 10 grams of the identified silicone material. The procedure can also be modified by substitution of other known metallo organic activators for the tin octoate, and by substitution of other retarders of the types identified above for the 2-amino-2-ethyl-1,3-propanediol.

It has also been found that a solution of tin octoate in 2-ethyl hexanoic acid deteriorates after standing for only a relatively short period of time. As deterioration proceeds, the tin octoate becomes progressively less effective as an activator until such as solution, after having aged for about three months, is completely unsuited for activating, in the proportions in which a fresh solution is used, the room temperature cure of a silicone rubber. It has been found that 4-dimethylamino azobenzene

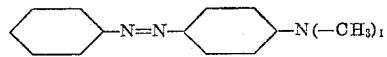

substantially retards such deterioration. A solution of tin octoate in 2-ethyl hexanoic acid which contains from about 0.02 percent to about 0.5 percent thereof is effective as an activator, in the same proportions as when fresh, after having stood for at least four months.

It has also been found that a dye or pigment can advantageously be added to the solution of tin octoate or other activator to provide a visual guide for sufficiency of mixing of the activator with the silicone material. Mixing is inadequate so long as the color of the mix is not uniform. A coloring material commercially available under the name "Victoria green" has been found to be suitable for dispersion as such a visual aid in the indicated solution of tin octoate in 2-ethyl hexanoic acid.

In some instances it has been found to be advantageous to increase the viscosity of a silicone impression material. This can be accomplished by adding an appropriate amount of hydroxyl ethyl cellulose to give the desired viscosity increase.

It will be apparent that various changes and modifications can be made from the specific details disclosed in the foregoing examples, and discussed herein, without departing from the spirit and scope of the attached claims.

This is a continuation-in-part of application Serial No. 646,570, filed March 18, 1957, and now abandoned.

What I claim is:

1. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentially of a solution of tin octoate and 2-amino-2-methyl-1,3-propanediol in proportions of from about 0.2 to 0.4 part of the former to from about 0.02 to 0.04 part of the latter.

2. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentialy of a solution of lithium octoate and 2-amino-2-methyl-1,3-propanediol in proportions of from about 0.2 to 0.4 part of the former to from about 0.02 to 0.04 part of the latter.

3. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentially of a solution of lead octoate and 2-amino-2-methyl-1,3-propanediol in proportions of from about 0.2 to 0.4 part of the former to from about 0.02 to 0.04 part of the latter.

4. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentially of a solution of an activator for the room-temperature-curable silicone which is a metal salt of an organic acid and is soluble in the silicone and 2-amino-2-methyl-1,3-propanediol in proportions of from about 0.2 to 0.4 part of the former to from about 0.02 to 0.04 part of the latter.

5. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentially of a solution of an activator for the room-temperature-curable silicone which is a metal salt of an organic acid and is soluble in the silicone and 2-amino-2-ethyl-1,3-propanediol in proportions of from about 0.2 to 0.4 part of the former to from about 0.02 to 0.04 part of the latter.

6. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentially of a solution of an activator for the room-temperature-curable silicone which is a metal salt of an organic acid and is soluble in the silicone and morpholine in proportions of from about 0.2 to 0.4 part of the former to from about 0.02 to 0.04 part of the latter.

7. An activator composition useful for curing to a solid condition a room-temperature-curable silicone comprising a linear, fluid methylpolysiloxane having terminal silicon-bonded hydroxyl groups and a viscosity of about 2000 centipoises at about 30° C., said activator composition consisting essentially of a solution of an activator for the room-temperature-curable silicone which is a metal salt of an organic acid and is soluble in the silicone and an amine type retarder selected from the group consisting of morpholine and those having the generic formula

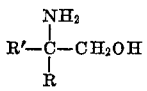

wherein R and R' are selected from the group consisting of alkyl, aryl, hydroxyl, alkaryl, aralkyl, substituted alkyl, substituted aryl, substituted aralkyl and substituted alkaryl in proportions of from about 0.2 to 0.4 part of the former to from about 0.02 to 0.04 part of the latter.

8. An activator composition useful for curing to a solid condition a room-temperature-curable silicone comprising a linear, fluid methylpolysiloxane having terminal silicone-bonded hydroxyl groups and a viscosity of about 2000 centipoises at about 30° C., said activator composition being a solution consisting essentially of about 10 parts of tin octoate and 1 part of 2-amino-2-methyl-1,3-propanediol.

9. An activator composition useful for curing to a solid condition a room-temperature-curable silicone comprising a linear, fluid methylpolysiloxane having terminal silicone-bonded hydroxyl groups and a viscosity of about 2000 centipoises at about 30° C., said activator composition being a solution consisting essentially of about 10 parts of lithium octoate and 1 part of 2-amino-2-methyl-1,3-propanediol.

10. An activator composition useful for curing to a solid condition a room-temperature-curable silicone comprising a linear, fluid methylpolysiloxane having terminal silicone-bonded hydroxyl groups and a viscosity of about 2000 centipoises at about 30° C., said activator composition being a solution consisting essentially of about 10 parts of lead octoate and 1 part of 2-amino-2-methyl-1,3-propanediol.

11. An activator composition useful for curing to a solid condition a room-temperature-curable silicone comprising a linear, fluid methylpolysiloxane having terminal silicone-bonded hydroxyl groups and a viscosity of about 2000 centipoises at about 30° C., said activator composition being a solution consisting essentially of about 10 parts of a metallo organic activator and 1 part of 2-amino-2-methyl-1,3-propanediol.

12. An activator composition useful for curing to a solid condition a room-temperature-curable silicone comprising a linear, fluid methylpolysiloxane having terminal silicone-bonded hydroxyl groups and a viscosity of about 2000 centipoises at about 30° C., said activator composition being a solution consisting essentially of about 10 parts of a metallo organic activator and 1 part of 2-amino-2-ethyl-1,3-propanediol.

13. An activator composition useful for curing to a solid condition a room-temperature-curable silicone comprising a linear, fluid methylpolysiloxane having terminal silicone-bonded hydroxyl groups and a viscosity of about 2000 centipoises at about 30° C., said activator composition being a solution consisting essentially of about 10 part of a metallo organic activator and 1 part of morpholine.

14. In a method for curing a silicone curable at room-temperature to a solid condition and comprising a linear, fluid methylpolysiloxane having terminal silicone bonded hydroxyl groups and a viscosity of about 2000 centipoises at about 30° C., which method includes the steps of mixing 100 parts of the silicone, in a curable condition, with a solution containing from about 0.2 to 0.4 part of an activator for the silicone, which activator is a metal salt of an organic acid and is soluble in the silicone, and allowing the resulting composition to cure to a solid condition at room temperature, the improvement which comprises admixing with the silicone, and the activator, a solution containing from about 0.02 to 0.04 part of an amine retarder selected from the group consisting of morpholine and those having the generic formula

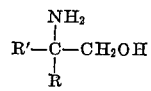

wherein R and R' are selected from the group consisting of alkyl, aryl, hydroxyl, alkaryl, aralkyl, substituted alkyl, substituted aryl, substituted aralkyl and substituted alkaryl.

15. In a method for curing a silicone curable at room-temperature to a solid condition and comprising a linear, fluid methylpolysiloxane having terminal silicone bonded hydroxyl groups and a viscosity of about 2000 centipoises at about 30° C., which method includes the steps of mixing 100 parts of the silicone, in a curable condition, with a solution containing from about 0.2 to 0.4 part of an activator for the silicone, which activator is a metal salt of an organic acid and is soluble in the silicone, and allowing the resulting composition to cure to a solid condition at room temperature, the improvement which comprises admixing with the silicone, and the activator, a solution containing an amount in the proportion of approximately 1 part, per 10 parts of the activator, of an amine retarder selected from the group consisting of morpholine and those having the generic formula

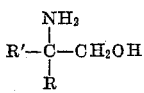

wherein R and R' are selected from the group consisting of alkyl, aryl, hydroxyl, alkaryl, aralkyl, substituted alkyl, substituted aryl, substituted aralkyl and substituted alkaryl.

16. A composition curable to an elastomeric condition which composition consists essentially of 100 parts of a silicone curable to an elastomeric condition at room temperature, and comprising a linear, fluid methylpolysiloxane having terminal silicone-bonded hydroxyl groups and a viscosity of about 2000 centipoises at about 30° C., a solution containing form about 0.2 to 0.4 part of an activator for the room-temperature-curable silicone, which activator is a metal salt of an organic acid and is soluble in the silicone, and a solution containing from about 0.02 to 0.04 part of an amine retarder selected from the group consisting of morpholine and those having the generic formula

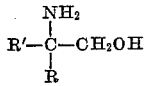

wherein R and R' are selected from the group consisting of alkyl, aryl, hydroxyl, alkaryl, aralkyl, substituted alkyl, substituted aryl, substituted aralkyl and substituted alkaryl.

17. A composition curable to an elastomeric condition, which composition consists essentially of 100 parts of a silicone curable to an elastomeric condition at room temperature, and comprising a linear, fluid methylpolysiloxane having terminal silicone-bonded hydroxyl groups and a viscosity of about 2000 centipoises at about 30° C., a solution containing from about 0.2 to 0.4 part of an activator for the room-temperature-curable silicone, which activator is a metal salt of an organic acid and is soluble in the silicone, and a solution containing an amount in the proportion of about 1 part, per 10 parts of the activator, of an amine retarder selected from the group consisting of morpholine and those having the generic formula

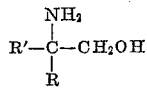

wherein R and R' are selected from the group consisting of alkyl, aryl, hydroxyl, alkaryl, aralkyl, substituted alkyl, substituted aryl, substituted aralkyl and substituted alkaryl.

18. A solution useful for curing to a solid, elastomeric condition a room-temperature-curable silicone comprising a linear, fluid methylpolysiloxane having terminal silicone-bonded hydroxyl groups and a viscosity of about 2000 centipoises at about 30° C., said solution consisting essentially of tin octoate and from about 0.02 percent to about 0.5 percent of 4-dimethylamino azobenzene, based upon the weight of the tin octoate.

19. A solution useful for curing to a solid, elastomeric condition a room-temperature-curable silicone comprising a linear, fluid methylpolysiloxane having terminal silicone-bonded hydroxyl groups and a viscosity of about 2000 centipoises at about 30° C., said solution consisting essentially of an activator for the silicone, which activator is a metal salt of an organic acid and is soluble in the silicone, and from about 0.02 percent to about 0.5 percent of 4-dimethylamino azobenzene, based upon the weight of the activator.

References Cited in the file of this patent
UNITED STATES PATENTS

| | | |
|---|---|---|
| 2,287,188 | Matheson et al. | June 23, 1942 |
| 2,389,805 | McGregor et al. | Nov. 27, 1945 |
| 2,449,572 | Welsh | Sept. 21, 1948 |
| 2,571,039 | Hyde | Oct. 9, 1951 |
| 2,652,385 | Hunter et al. | Sept. 15, 1953 |
| 2,719,090 | Morehead | Sept. 27, 1955 |
| 2,759,904 | Talcott | Aug. 21, 1956 |
| 2,814,601 | Currie et al. | Nov. 26, 1957 |
| 2,833,742 | Koch | May 6, 1958 |
| 2,843,555 | Berridge | July 15, 1958 |

OTHER REFERENCES

A Manual of Pharmacology, Sallmann, 1957, W. B. Saunders Co., Phila., 8th edition, pages 1045–48; 1310 and 1337–52 relied on.